United States Patent [19]

Matsuda et al.

[11] 4,430,714
[45] Feb. 7, 1984

[54] BRAKE CONTROL SYSTEM FOR AN AUTOMOTIVE VEHICLE

[75] Inventors: Toshiro Matsuda; Minoru Honda, both of Yokohama, Japan

[73] Assignee: Nissan Motor Company, Limited, Kanagawa, Japan

[21] Appl. No.: 208,683

[22] Filed: Nov. 20, 1980

[30] Foreign Application Priority Data

Nov. 20, 1979 [JP] Japan ................. 54-149451

[51] Int. Cl.³ .............................................. B60T 8/02
[52] U.S. Cl. ..................................... 364/426; 303/95; 303/100; 303/105
[58] Field of Search .................. 364/426; 303/95, 101, 303/105, 110

[56] References Cited

U.S. PATENT DOCUMENTS

| | | | |
|---|---|---|---|
| 3,578,819 | 5/1971 | Atkins | 303/21 |
| 3,604,760 | 9/1971 | Atkins | 303/21 CG |
| 3,612,622 | 10/1971 | Riordan | 303/21 P |
| 3,897,114 | 7/1975 | Scharlack | 303/21 BE |
| 4,022,512 | 5/1977 | Hirzel et al. | 303/93 |
| 4,094,556 | 6/1978 | Okamoto et al. | 303/109 |

FOREIGN PATENT DOCUMENTS

| | | |
|---|---|---|
| 2052457 | 5/1971 | Fed. Rep. of Germany . |
| 2255241 | 3/1972 | Fed. Rep. of Germany . |
| 1420034 | 6/1971 | United Kingdom . |
| 1235016 | 1/1976 | United Kingdom . |

Primary Examiner—J. V. Truhe
Assistant Examiner—Saul M. Bergmann
Attorney, Agent, or Firm—Lowe, King, Price & Becker

[57] ABSTRACT

A brake control system includes devices for determining wheel r.p.m. for determining an acceleration rate of the wheel r.p.m. and generating a signal when the determined acceleration rate becomes equal to or greater than a predetermined value, and for determining a target wheel r.p.m. based on the wheel r.p.m. The target wheel determining device is operatively responsive to detection of the peak of the coefficient of friction. A control device is provided for controlling applying and releasing of fluid pressure to wheel cylinders for skid controlling the wheel deceleration rate. The target wheel r.p.m. determining device determines the rate of deceleration of wheel r.p.m. based on the difference of wheel r.p.m. between the detection time of a peak of the coefficient of friction and the detection time of the immediately preceding peak and on the length of the period between detections of the peaks. The device thereby determines the target wheel r.p.m. by subtracting a deceleration value, obtained as a function of the determined rate of deceleration, from the wheel r.p.m. determined at the time of detecting of the peaks of the coefficient of friction.

22 Claims, 15 Drawing Figures

BRAKE CONTROL SYSTEM FOR AN AUTOMOTIVE VEHICLE

BACKGROUND OF THE INVENTION

The present invention relates generally to a brake control system for an automotive vehicle for controlling application and release of brake pressure in order to prevent the vehicle from skidding upon a rapid application of the vehicle brakes, as in an emergency situation. More specifically, the invention relates to an anti-skid brake control system for controlling the deceleration rate of the vehicle wheel r.p.m. relative to vehicle speed corresponding to friction between the wheel tread and road surface, in order to prevent the vehicle wheel from locking and thereby to prevent the vehicle from skidding.

Upon braking of a moving vehicle and the like such as an automotive vehicle, a vehicle wheel is apt to be locked to cause skidding. This will necessarily create an unstable condition in the controlled motion of the vehicle. Wheel lock-up may cause such a loss in directional stability as to result in an uncontrolled skidding, while, at the same time, the presence of locked wheels generally increases the distance required to stop the vehicle due to a reduced coefficient of friction which occurs while skidding under most road conditions. If skidding can be prevented, the vehicle can usually be stopped with greater safety in a shorter distance. Therefore, various brake control systems have been developed for preventing the wheels from locking, thereby preventing the vehicle from skidding. General and typical construction of such a brake control system has been described in U.S. Pat. No. 3,897,114, entitled "SKID CONTROL SYSTEM" to Ronald S. Scharlark. The U.S. Patent discloses a brake control system for controlling the braking of a wheeled vehicle to prevent skidding. The system functions to relieve the braking force applied to the vehicle wheel. The system is effectively responsive to a critical slip signal. The signal is generated in response to a sensed difference between a hypothetical vehicle deceleration, as approximated by a decreasing ramp signal, and the vehicle wheel r.p.m. The comparison is made on a differential basis to provide an output signal which is utilized in controlling an output gate. The braking force is reapplied upon the sensing of a positive wheel acceleration signal and a change in the sign of the rate of change of wheel acceleration from a positive to a negative value. During this period, the skid signal is ineffective to control the brake force.

As is known by those skilled in the art, when rapid braking is applied to a vehicle, a maximum braking effect can be obtained by providing approximately a 15% slip rate for the vehicle wheel with respect to the road surface, since the friction between the wheel tread and road surface is maximized at that rate. Accordingly, upon emergency and rapid brake operation, it is preferable to control wheel r.p.m. relative to the vehicle speed so that it becomes about 15% lower than the vehicle speed. Namely, the brake control system operates to control the deceleration rate of the wheel r.p.m. with respect to the vehicle speed so that the wheel r.p.m. is not excessively decelerated relative to the vehicle speed. Such operation is provided to avoid locking of the wheels and resultant slipping on the road surface. In practice, when the wheel r.p.m. is decelerated to be about 15% lower than the vehicle speed, a target wheel r.p.m. is determined based on the wheel r.p.m. and on a predetermined friction coefficient. Corresponding to the determined target wheel r.p.m., the deceleration rate of the wheel r.p.m. is controlled to change the actual wheel r.p.m. to approach the target wheel r.p.m. Thus, since the deceleration rate of the vehicle depends on friction between the wheel tread and the road surface, the target wheel r.p.m. is determined based on the vehicle speed and the friction coefficient.

In actual operation, the braking fluid pressure applied to the brake device of each wheel, i.e., to each wheel cylinder, is relieved in response to decelerating of the wheel r.p.m. to a lower speed than the target wheel r.p.m. Upon the occurrence of such a condition, the braking fluid pressure is again applied to the brake device of each wheel. By repeating this operation, the vehicle can be gradually and stably decelerated without causing locking of the wheel and therefore without causing wheel skidding on the road surface.

In the conventional system, the friction coefficient between the wheel tread and the road surface is presumed to be a constant value which is determined based on general road surface conditions. However, the actual friction coefficient of the wheel tread and the road surface varies considerably depending on wheel tread wear and the road surface conditions. If the actual friction coefficient is different from that of the presumed and predetermined value, the target wheel r.p.m. determined based on the predetermined friction coefficient may not correspond to the actual vehicle speed.

For situations wherein the actual friction coefficient is larger than the predetermined value, the wheel r.p.m. is rather rapidly decelerated to reach a predetermined r.p.m. after a relatively short time from braking operation. At the predetermined wheel r.p.m., the target wheel r.p.m. is determined and the brake control system becomes operative. By entering into the skid controlled state a relatively short period after application of the brake, the target wheel r.p.m. is determined based on a relatively high vehicle speed. Therefore, the braking distance is longer than that required. To the contrary, if the actual friction coefficient is smaller than the predetermined value, it takes a relatively long period to decelerate the wheel r.p.m. to the predetermined target speed value. Thus, if a target speed is determined which is considerably lower than the vehicle speed, it is possible to cause locking of the wheel.

For effectively and satisfactorily controlling vehicle skid due to the vehicle brake system, it is required to determine the most suitable deceleration rate corresponding to friction between the wheel tread and the road surface. As stated above, the friction between the wheel tread and the road surface is maximized for a wheel decelerating rate approximately 15% lower than the vehicle speed. Therefore, by determining the peak coefficient of friction in each cycle of skid control operation and by controlling the ratio of applying and releasing the brake fluid pressure to the wheel cylinder corresponding to detected peaks of the coefficient of friction, the vehicle braking operation can be effected most effectively and satisfactorily.

Various approaches may be used in order to determine the friction condition between the wheel tread and the road surface and for discriminating the peak of the friction coefficient. For example, the friction coefficient may be determined as a function of wheel acceleration, wheel load and brake torque, or by determining the deceleration ratio of the wheel r.p.m. based on measured wheel r.p.m. In a method for discriminating the peak of the friction coefficient, the wheel r.p.m. is measured when the braking pressure is relieved in order to recover the wheel r.p.m. Based on the measured wheel r.p.m., the acceleration ratio of the wheel r.p.m. is determined during the wheel r.p.m. recovery period in which brake pressure is released. Since, in this manner, the wheel r.p.m. is not seriously affected as the result of a determination of the acceleration ratio, the friction between the wheel tread and the road surface can be more accurately determined.

SUMMARY OF THE INVENTION

Therefore, it is an object of the present invention to provide a brake control system for an automotive vehicle having a means for determining a target wheel r.p.m. for each cycle of skid control operation, which target wheel r.p.m. is variable corresponding to variation of friction coefficient between the wheel tread and the road surface.

It is another and more specific object of the present invention to provide a brake control system for skid controlling the vehicle brake system, in which the peak of the friction coefficient is discriminated from the acceleration ratio of the wheel r.p.m. during recovery of the wheel r.p.m. by releasing of brake pressure.

To accomplish the above-mentioned and other objects of the present invention, there is provided in accordance with a preferred embodiment of the invention a brake control system having a means for determining wheel r.p.m., a means for determining an acceleration ratio of the wheel r.p.m. and for generating a signal when the determined acceleration ratio becomes equal to or greater than a predetermined value, a means for determining a target wheel r.p.m. based on the wheel r.p.m. and being operatively responsive to detection of the peak of the coefficient of friction, and a control means for controlling application and release of fluid pressure to wheel cylinders for skid controlling the wheel deceleration ratio. The means for determining target wheel r.p.m. determines the rate of deceleration of wheel r.p.m. based on the difference of wheel r.p.m. between the time of detecting the peak of the friction coefficient and the time of detecting the immediate preceding peak and on the length of time between detection of the peaks. The target wheel r.p.m. is then determined by subtracting a deceleration value, based on the determined rate of deceleration, from the wheel r.p.m. determined at the direction time of the peaks of friction coefficient.

Preferably, the brake pressure when released is kept at a constant level. Thus, the wheel r.p.m. is accelerated depending only on the friction between the wheel tread and the road surface. Therefore, by keeping the brake pressure at a constant level when the wheel r.p.m. is recovering, the variation of the friction between the wheel tread and the road surface can be more accurately and effectively determined.

Other objects and advantages to be accomplished by the present invention will become apparent from the following.

BRIEF DESCRIPTION OF THE DRAWINGS

The present invention will become more fully understood from a detailed description thereof provided hereinbelow and from the accompanying drawings of the preferred embodiments of the present invention, which however, should not be taken as limitative of the present invention but rather only as explanatory and illustrative thereof.

In the drawings.

DESCRIPTION OF THE PREFERRED EMBODIMENT

Figure 1:
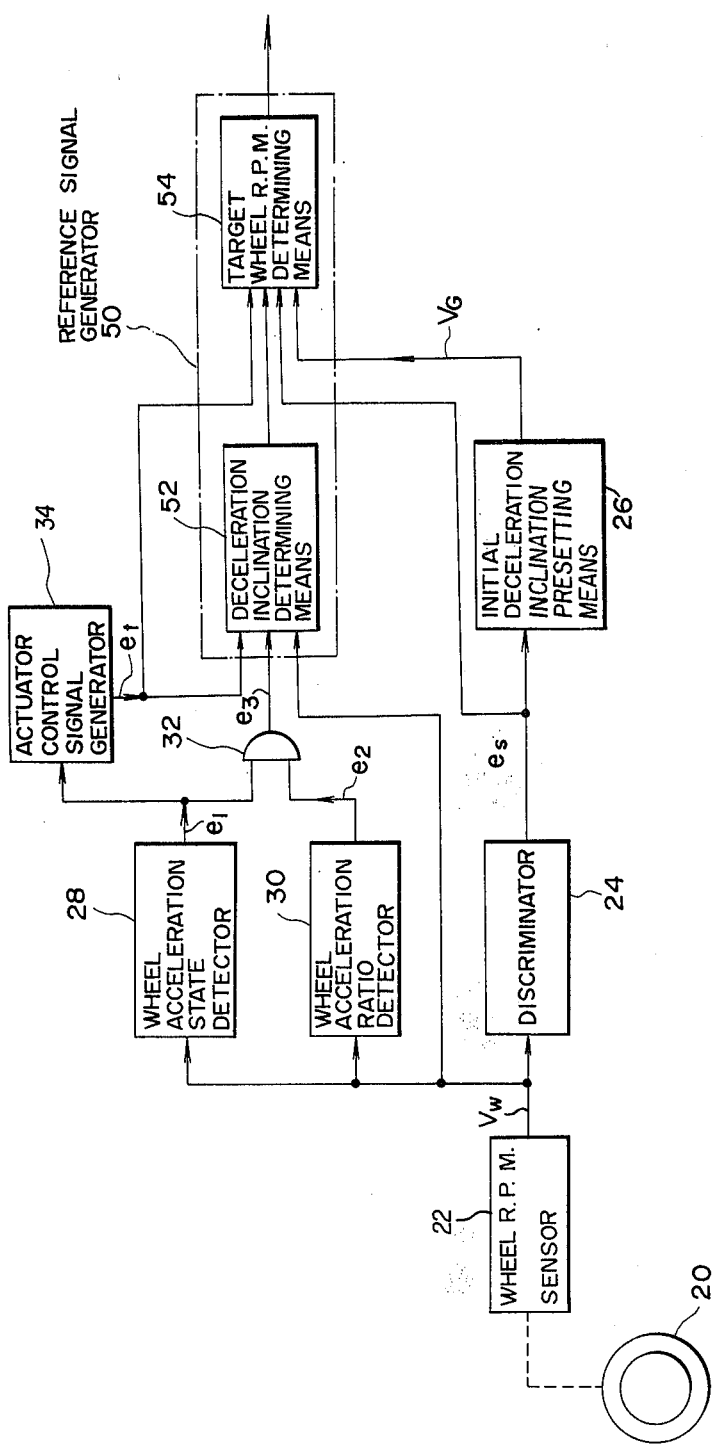
FIG. 1 is a schematic diagram of a preferred embodiment of a brake control system according to the present invention, in which a well-known control unit for controlling application and releasing of brake pressure is omitted.

According to the present invention, the preferred embodiment of a brake control system controls application and release of pressure fluid to a wheel cylinder for preventing the wheel from locking and thereby for preventing the vehicle from skidding. In the brake system according to the present invention, timing for releasing the fluid pressure and thereby releasing the brake is determined based on wheel r.p.m. as determined by a wheel r.p.m. sensor having a signal generating circuit, and on a target wheel r.p.m., as determined by a target wheel r.p.m. determining circuit including a signal generating circuit therein.

A skid control means in the brake control system generates a control signal for actuating a means for relieving pressure fluid in the wheel cylinder when the wheel r.p.m. is decelerated to a value equal to or less than the target wheel r.p.m. For this purpose, the skid control means comprises a comparator circuit, including a differential circuit means for comparing the wheel r.p.m. with the target wheel r.p.m. during the brake portion of the skid control cycle. The comparator circuit provides an output signal when the wheel r.p.m. bears a preselected relationship to the target wheel r.p.m.

In the preferred embodiment of the present invention, the target wheel r.p.m. is varied corresponding to variation of the coefficient of friction between the wheel tread and the road surface. The brake control further comprises a charge storage device which is supplied with electric energy when the wheel r.p.m. bears a preselected relationship to the charge on the storage device. The preselected relationship occurs when the wheel r.p.m. exceeds the charge on the storage device. The skid control system further includes a circuit for discharging the storage device when the wheel r.p.m. is less than the charge on the storage device. The discharge device causes the discharge of the storage device in accordance with a preselected deceleration relationship to approximate the deceleration of the vehicle.

A circuit means is provided for giving greater effect to the target wheel r.p.m. as compared to the wheel r.p.m., in order to create a differential between both the r.p.m.'s. The differential creating circuit means includes a fixed voltage drop circuit in the target wheel r.p.m. signal generating circuit and a fixed voltage drop circuit in the wheel r.p.m. signal generating circuit. The fixed voltage drop provided in the target wheel r.p.m. determining circuit exceeds that of the wheel r.p.m. sensor circuit. A means is provided for generating an output signal when the wheel r.p.m. signal falls a preselected magnitude below the target wheel r.p.m. signal, to create a critical slip signal. An output circuit controls the application of brake pressure responsive thereto.

The critical slip signal provides an output signal to release brake pressure when the critical value is obtained and a slip circuit disabling means is connected in response to provision of the output critical slip signal to said output circuit. The disabling means operates to disable the output circuit when the output signal is generated. The critical slip signal thus causes a brake relieving condition which relieves brake pressure on the vehicle wheels. The skid control system further includes a pressure applying circuit means including a first signal generating means responsive to said wheel r.p.m. for generating a rate of change of wheel acceleration signal and second circuit means for generating a wheel acceleration signal. An output gate means correlates the rate of change of acceleration signal and the wheel acceleration signal to control the reapplication of brake pressure to the wheels.

Referring now to the drawings, particularly to FIG. 1, there is illustrated a fundamental structure of a preferred embodiment of a brake control system according to the present invention. It will be appreciated that although there is not illustrated the entire structure of the control system, the remaining parts of the system, for example a control unit or means for determining control ratio of application and release of brake pressure to each wheel cylinder to reduce the difference between actual and target r.p.m., are well known to those skilled in the art. Therefore, it will be understood that there is hereinafter described a characterizing part of the brake control system achieving advantages and objects sought in the present invention.

Referring now to FIG. 1, the reference numeral 20 denotes a wheel of the vehicle. Since the duration of a skid control cycle of a driven wheel is substantially shorter than that of a driving wheel due to a substantially smaller inertia moment, it is beneficial to use driven wheel control parameters, e.g. wheel r.p.m., deceleration ratio, target wheel r.p.m. and so on as determined in skid control operation of the driven wheel, for skid control of the driving wheel. Therefore, in the shown embodiment, the wheel 20 represents the driven wheel for providing the necessary skid control parameters for driving wheel skid control operation. To the wheel axle of the wheel 20, a wheel r.p.m. sensor 22 is provided for determining wheel r.p.m. The wheel r.p.m. sensor 22 generates a sensor signal $V_W$ indicative of the determined wheel r.p.m.

A discriminator 24 receives the sensor signal $V_W$ from the wheel r.p.m. sensor 22 and differentiates the signal value in order to determine a deceleration rate $dV_W/dt$ of the wheel r.p.m. The determined deceleration rate $dV_W/dt$ is compared with a predetermined value preset in the discriminator 24. Generally, the predetermined value corresponds to a deceleration rate observable when the friction between the wheel tread and the road surface attains a maximum during a cycle of skid control. In other words, the predetermined value of the deceleration rate $dV_W/dt$ represents a wheel r.p.m. approximately 15% lower than the vehicle speed.

The discriminator 24 generates a peak signal $e_s$ when the determined deceleration rate $dV_W/dt$ equals or exceeds the predetermined value. The peak signal $e_s$ is fed to an initial decelerating inclination presetting means 26 to output a signal $V_G$ indicative of an initial deceleration inclination $DV_w/Dt$ for the first cycle of skid control operation. The deceleration inclination is defined as the time ratio of change of velocity over a particular time interval and represents the slope of a line connecting ordinates representing velocities at specific points of time on a velocity vs. time curve, divided by that time interval. Based on the initial deceleration inclination indicated in the signal $V_G$, a reference signal generator 50, which will be described herebelow, generates a reference signal $V_{w0}$ indicative of an initial target wheel r.p.m.

On the other hand, the sensor signal $V_W$ is also fed to a wheel acceleration state detector 28 and to a wheel acceleration ratio detector 30. Both of the detectors 28 and 30 respectively differentiate the sensor signal value and thereby determine an acceleration rate $a_w$ during a recovery period for wheel r.p.m. responsive to release of brake pressure. Based on the determined acceleration rate $a_w$ of the wheel r.p.m., the detectors 28 and 30 discriminate the peak of the friction F between the wheel tread and the road surface. In actual operation, the wheel acceleration state detector 28 differentiates the sensor signal value to obtain the acceleration rate $a_w$ of the wheel r.p.m. upon acceleration of the wheel. The determined acceleration rate $a_w$ is compared with a first preset value $a_1$ which is preset in the wheel acceleration state detector 28. When the determined acceleration rate $a_w$ of the wheel r.p.m. equals or exceeds the preset value $a_1$, the wheel acceleration state detector 28 generates an output $e_1$. Likewise, the wheel acceleration ratio detector 30 differentiates the sensor signal value to obtain an acceleration rate $a_w$. The determined acceleration rate $a_w$ is compared with a second preset value $a_2$. When the determined acceleration rate $a_1$ equals or exceeds the preset value $a_2$, the wheel acceleration ratio detector 30 generates an output $e_2$. Both of the outputs $e_1$ and $e_2$ are fed to an AND gate 32. The AND gate 32 perfoms an AND function on the outputs $e_1$ and $e_2$ and generates an output $e_3$ indicative of the obtained AND function.

Here, it should be noted that the first preset value $a_1$ is smaller than the second preset value $a_2$. Therefore, the AND gate 32 outputs the output $e_3$ when the wheel is in a state of acceleration ($a_w$ being larger than $a_1$) and the acceleration ratio is equal to or greater than the preset value $a_2$.

Figure 2:
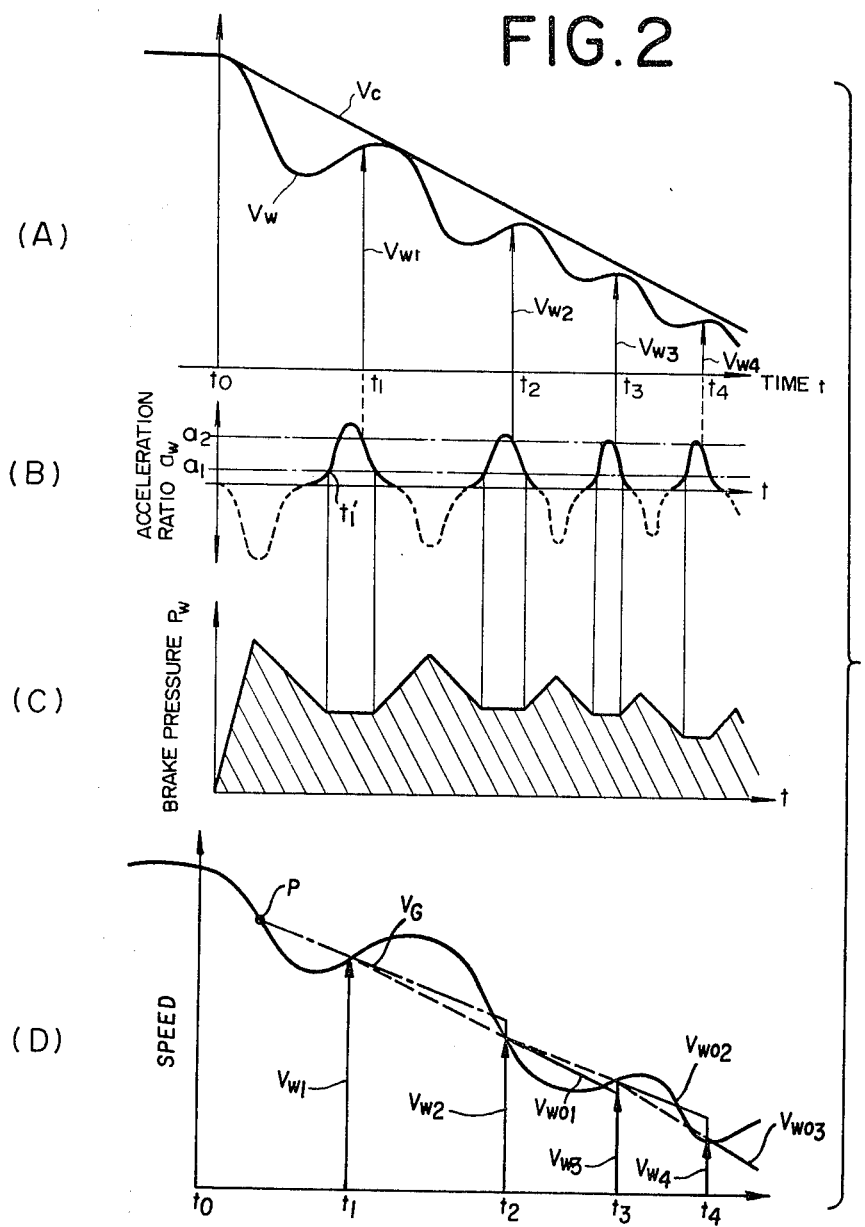
FIG. 2 is a graph showing the relationship of variations of wheel r.p.m., acceleration ratio, brake pressure and sampled and clamped wheel r.p.m.

The output $e_3$ of the AND gate 32 is fed to reference signal generator 50 which determines wheel r.p.m. $V_{w1}$, $V_{w2}$, $V_{w3}$, $V_{w4}$, $V_{w5}$ ... at specific times $t_1$, $t_2$, $t_3$, $t_4$, $t_5$ ... as shown at FIG. 2. Based on the sensor signal $V_w$ indicative of the determined wheel r.p.m., the reference signal generator 50 determines target wheel r.p.m. $V_{w0}$ within a period of duration of one cycle of skid control operation as a function of the deceleration inclination for the preceding cycle. For example, for the period $t_2$ to $t_3$ the target wheel r.p.m. $V_{w0}$ is determined as a linear time function of the deceleration inclination $-D_{Vw}/D_t = (-V_{w1} + V_{w2})/(t_{1-t2})$ for the period $t_1$ to $t_2$. Likewise, the target wheel r.p.m. $V_{w0}$ in the period $t_3$ to $t_4$ is determined as a linear time function of the deceleration inclination for the period $t_2$ to $t_3$. By repeating this operation the target wheel r.p.m. $V_{w0}$ is varied corresponding to the deceleration inclination $-D_{Vw}/D_t$ of the immediately preceding cycle of skid control operation. As is apparent from FIG. 2, the target wheel r.p.m. in a current cycle thus possesses the same slope, or inclination, as a straight line connecting the points on the curve of wheel velocity vs. time for the immediately preceding cycle, with the initial value of $V_{w0}$ during the current cycle corresponding to the observed wheel velocity at the last time that the output $e_3$ of AND gate 32 was high.

The reference signal generator 50 comprises a deceleration inclination determining means 52 and a target wheel r.p.m. determining means 54. The deceleration inclination determining means 52 samples and clamps the sensor signal value indicative of current wheel r.p.m. in response to a falling edge of the AND gate output $e_3$. The deceleration inclination determining means 52 stores both the current wheel r.p.m. and the wheel r.p.m. clamped in response to the immediately preceding AND output $e_3$. Based on both signal values stored therein, the deceleration inclination determining means 52 effects a subtraction operation to determine the difference between the clamped signal values, thus determining the difference of wheel r.p.m. For example, assuming the clamped wheel r.p.m.'s are respectively $V_{w1}$ and $V_{w2}$, the difference $D_{Vw}$ obtained from the subtracting operation is $V_{w1} - V_{w2}$.

It will be appreciated that after determining the deceleration inclination and the target wheel r.p.m., the clamped wheel r.p.m. of the preceding cycle is cleared.

Intervals between the AND gate outputs $e_3$ are also measured in order to determine the duration of each cycle of skid control operation. The deceleration inclination determining means 52 divides the determined difference $D_{Vw}$ of the wheel r.p.m. ($V_{w1} - V_{w2}$) by the determined duration $D_t$ of the skid control operation to obtain the deceleration inclination ($D_{Vw}/D_t$). Based on the determined deceleration inclination, the target wheel r.p.m. determining means 54 calculates a target wheel r.p.m deceleration and generates a ramp signal indicative of the determined target deceleration. From the wheel r.p.m. current at the time of generating the AND gate output $e_3$, the target wheel r.p.m. determining means 54 determines the target wheel r.p.m. $V_{w0}$. The determined target wheel r.p.m. is fed to the control unit (not shown) to be compared with the actual wheel r.p.m. sequentially determined by the wheel r.p.m. sensor 22. If the actual wheel r.p.m. becomes lower than the target wheel r.p.m. the control unit generates a command signal. Responsive to the command signal of the control unit, the actuator for operating the braking device (e.g., wheel brake cylinder) for each driving wheel becomes operative to release brake pressure applied thereto.

An actuator control signal generator 34 is in communication with the wheel acceleration state detector 28. The actuator control signal generator 34 is responsive to the output $e_1$ of the wheel acceleration state detector 28 to control the release of braking pressure. Namely, when the determined acceleration ratio of the wheel r.p.m. exceeds the preset value $a_1$, the actuator control signal generator 34 generates a control signal for controlling release of braking pressure, so that the braking pressure applied to the wheel cylinder may be kept at a constant level. By keeping the brake pressure at a constant level responsive to the detector signal $e_1$, the wheel r.p.m. varies only as a function of the friction between the wheel tread and the road surface. That is, upon releasing brake pressure, the wheel r.p.m. is accelerated by the inertia applied to the vehicle. At this time, since the vehicle accelerator is released to decelerate the engine speed and since the brake pressure applied to the wheel cylinder is kept at a constant level, both the engine power and the released brake pressure can be disregarded with respect to acceleration of wheel r.p.m. Therefore, the inertia applied to the vehicle is transmitted to the vehicle wheel due to friction of the wheel tread with respect to the road surface.

FIG. 2 includes graphs A and B showing the variation of wheel r.p.m. in response to brake application under skid control and variation of the acceleration rate while the braking pressure applied to the wheel cylinder is released by skid control operation. The functions of the brake control system of FIG. 1 will be described herebelow with reference to the graphs of FIG. 2. Assuming the brake is applied at a point $t_1$, the wheel r.p.m. is gradually decelerated under skid control as represented in a curve $V_w$. As seen from that curve, the wheel r.p.m. alternately decelerates and accelerates in each skid cycle between $t_0$ and $t_1$, $t_1$ and $t_2$.... Acceleration of the wheel is represented by solid portions of a curve $a_w$ of graph B of FIG. 2, showing the wheel acceleration rate. Alternatively, the deceleration of the wheel is represented by dashed portions of the curve $a_w$. During skid control operation, the braking pressure applied to each of the wheel cylinders is released upon the wheel r.p.m. being decelerated beyond a given amount, as may be seen from graphs B and C. By releasing the braking pressure, the wheel r.p.m. recovers and is accelerated by inertia applied to the vehicle. When the acceleration ratio $a_w$ exceeds the predetermined value $a_1$ at the point $t_1'$, the wheel acceleration state detector 28 outputs the high level output $e_1$. The output $e_1$ of the wheel acceleration state detector 28 is fed to the AND gate 32 and also to the actuator control signal generator 34. The actuator control signal generator 34 generates a command signal to stop release of braking pressure and to keep the brake pressure at a constant level in response to the detector output $e_1$. By further acceleration of wheel r.p.m., the wheel acceleration ratio detector 30 detects the acceleration ratio $a_w$ of the wheel r.p.m. as exceeding the predetermined value $a_2$ and generates the output $e_2$. The detector output $e_2$ is also fed to the AND gate 32 and is ANDed with the detector output $e_1$. By obtaining the AND function of detector outputs $e_1$ and $e_2$, AND gate 32 outputs the high level output $e_3$. Responsive to the AND gate output $e_3$, the deceleration inclination determining means 52 samples and clamps the sensor signal value indicative of the current wheel r.p.m. and, responsive to termination of the AND gate output $e_3$, the target wheel r.p.m. values are determinated from $V_{w1}$, $V_{w2}$, $V_{w3}$, . . . at points $t_1$, $t_2$, $t_3$. As stated above, the deceleration inclination determining means 52 determines the deceleration inclination based on the difference of wheel r.p.m. and on length of intervals between consecutive pairs of points $t_1$, $t_2$, $t_3$ . . . . Based on the determined deceleration inclination $D_{Vw}/D_t$, the target wheel r.p.m. determining means 54 determines the target wheel r.p.m. for each cycle of skid control operation, as represented by straight lines $V_{w0}$ of graph D of FIG. 2. Since the target wheel r.p.m. is determined corresponding to the determined deceleration inclination of wheel r.p.m. in each cycle of skid control operation, the target wheel r.p.m. can be varied corresponding to variation of the friction coefficient between the wheel tread and the road surface.

Variation of the target wheel r.p.m. $V_{w0}$ can be seen from graph D of FIG. 2. FIG. 2 should be compared with FIG. 3 in which is illustrated the variation of wheel r.p.m. and vehicle speed according to a conventional brake control system. As seen from FIG. 3, the prior art target wheel r.p.m. $V_{w0}$ is determined to have a fixed inclination, corresponding to a presumed fixed value of the friction coefficient. Therefore, in the conventional brake control system, the target wheel r.p.m. $V_w0$ cannot always correspond to variation of wheel r.p.m. and the vehicle speed. Contrary to this, according to the present invention, since the friction coefficient F is repeatedly determined in a sequence of operations and the target wheel r.p.m. corresponds to the determined friction coefficient, the target wheel r.p.m. can satisfactorily correspond to variations of the wheel r.p.m. and vehicle speed.

Based on the determined target wheel r.p.m., either one or both of the driving wheel and driven wheel are skid controlled to reduce the difference between actual and target r.p.m.

It is preferred that on the first cycle of skid control operation, the discriminator 24 determine a deceleration ratio of wheel r.p.m. based on the sensor signal $V_w$ indicative of actual wheel r.p.m. When the determined deceleration ratio is equal to or greater than a predetermined value, the discriminator generates an output $e_s$. The discriminator output $e_s$ is fed to the initial deceleration inclination presetting means 26. The initial deceleration inclination presetting means 26 provides an output $V_G$ indicative of a predetermined deceleration inclination which is input to the target wheel r.p.m. determining means 54 of the reference signal generator 50. The target wheel r.p.m. determining means 54 thus determines the target wheel r.p.m. for the first cycle of the skid control operation based on the output $V_G$.

The brake control system according to the present invention constructed as above can thus vary the target wheel r.p.m. corresponding to variations in friction coefficient between the wheel tread and the road surface, since the acceleration ratio determined by the acceleration state detector 28 and wheel acceleration ratio detector 30 is varied depending only on the friction between the wheel tread and the road surface. This single dependency is achieved by maintaining the braking pressure at a constant level during a time period determined by the output $e_1$. Thus, the friction of the wheel tread with respect to the road surface is exactly and satisfactorily determined, so that the target wheel r.p.m. can effectively correspond to the determined friction. Further, in accordance with the foregoing description, the wheel r.p.m. during an acceleration state will approach a slip ratio approximating 15%. I.e., the peripheral wheel speed is lower than the vehicle speed by about 15% and operation is thus close to the point where the slip ratio is about 15%. At the point where the wheel slip approximates 15%, the sensor signal value is sampled by the wheel deceleration inclination determining means 52.

Figure 4:
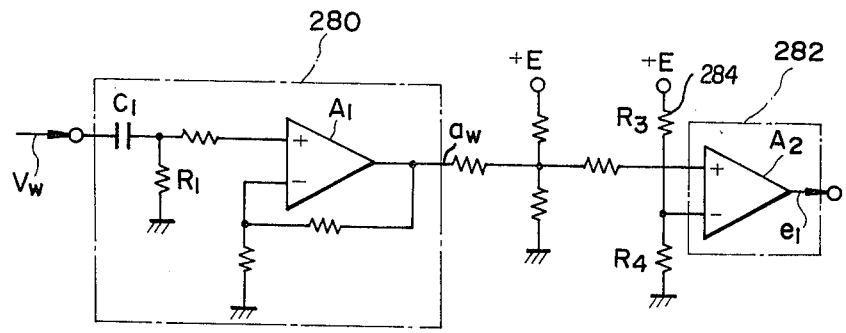
FIG. 4 is a circuit diagram of a preferred embodiment of a wheel acceleration state detector employed in the brake control system of FIG. 1.

Referring now to FIG. 4, there is illustrated a preferred circuit construction of the wheel acceleration state detector 28. Generally, the detector 28 comprises a differentiation circuit 280 and a comparator 282. The differentiation circuit 280 comprises a capacitor $C_1$, a resistor $R_1$ and an amplifier $A_1$. In the circuit 280, the sensor signal value indicative of the actual wheel r.p.m. $V_w$ is differentiated to obtain the acceleration rate $a_w$. The obtained acceleration rate $a_w$ is compared with a preset value $a_1$ determined by a dividing circuit 284 interposed between the differentiation circuit 280 and the comparator 282 and comprising resistors $R_3$ and $R_4$. If the acceleration ratio $a_w$ is larger than the preset value $a_1$, the wheel acceleration state detector 28 outputs the high level output $e_1$.

Figure 5:
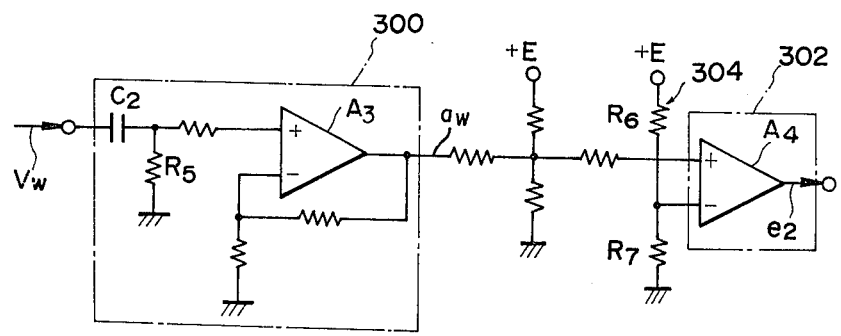
FIG. 5 is a circuit diagram of a preferred embodiment of a wheel acceleration ratio detector employed in the brake control system of FIG. 1.

FIG. 5 shows a preferred circuit construction of the wheel acceleration ratio detector 30 which generally comprises a differentiation circuit 300 and a comparator 302. The differentiation circuit 300 comprises a capacitor $C_2$, resistor $R_5$ and an amplifier $A_3$. The differentiation circuit differentiates the signal value of the sensor signal $V_w$ to obtain the acceleration rate $a_w$ similarly to the corresponding differentitaion circuit 280 of the wheel acceleration state detector 280. The obtained acceleration rate is fed to the comparator 302 comprised of an amplifier $A_4$ and compared with a preset value $a_2$ determined by a dividing circuit 304 and the comparator 302. The comparator 302 outputs a high level output $e_2$ when the obtained acceleration ratio exceeds the preset value $a_2$.

It will be appreciated that although the embodiment shows two differentiation circuits respectively for the wheel acceleration state detector 28 and the wheel acceleration ratio detector 30, a single differentiation circuit can be employed commonly thereto for providing to each the differentiated sensor signal value indicative of the wheel acceleration ratio. Also, it should be understood that though specific circuit structures for the wheel acceleration state detector 28 and the wheel acceleration ratio detector 30 are shown respectively in FIGS. 4 and 5, these can be replaced by any suitable circuit performing the required operation.

Figure 6:
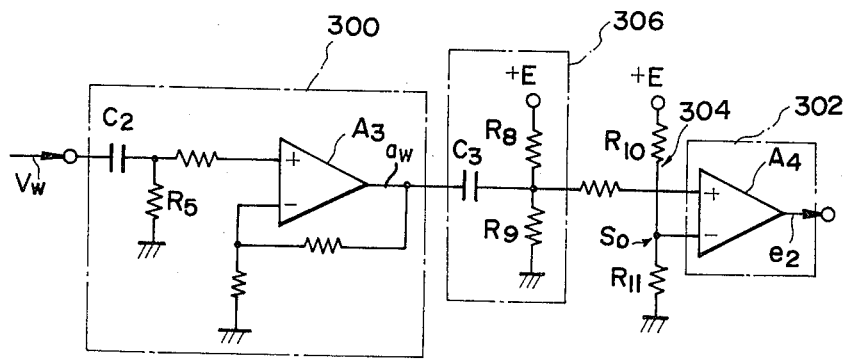
FIG. 6 is a circuit diagram of a modification of the wheel acceleration ratio detector of FIG. 5 to be employed in the brake control system of FIG. 1.

FIG. 6 shows a modification of the wheel acceleration ratio detector 30 of FIG. 5. In FIG. 6, the elements comprising the detector 30 and corresponding to elements illustrated in FIG. 5 are represented by the same reference numerals. In the present modification, a differentiation circuit 306 is interposed between the differentiation circuit 300 and the comparator 304. The differentiation circuit 306 further differentiates the value obtained by the differentiation circuit 300 to obtain the variation rate of the wheel r.p.m. In this modification, the obtained variation rate and variation of braking pressure under skid control operation in use with the brake control system including the wheel acceleration ratio detector of FIG. 6 will be shown in FIG. 7.

Figure 7:
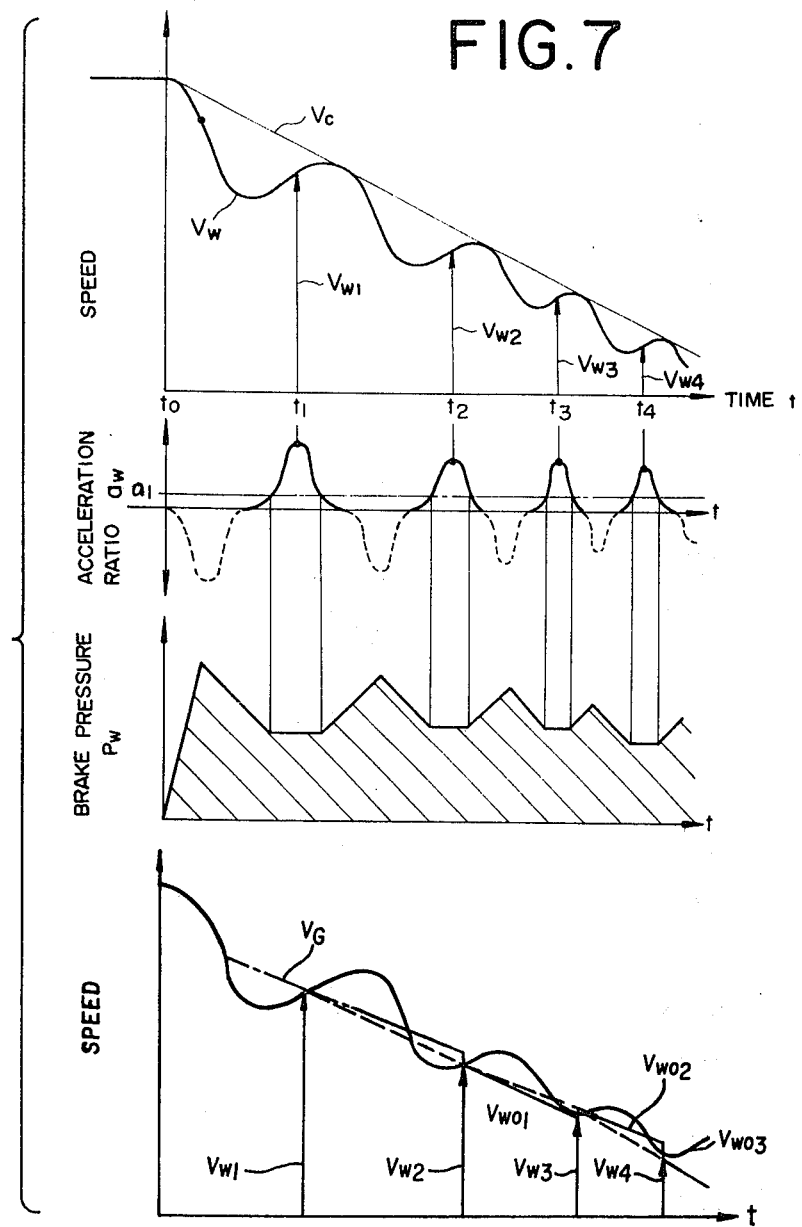
FIG. 7 is a graph showing the relationship of variations of vehicle speed and wheel r.p.m., the acceleration ratio, brake pressure and sampled and clamped wheel r.p.m.

Since the amplifier $A_4$ of comparator 302 outputs a high level output $e_2$ when the determined variation rate of $a_w$ is larger than zero, the peak of the acceleration rate can be detected and the wheel r.p.m. at the time of peak acceleration rate can be sampled and clamped in the deceleration inclination determining circuit 52. Thereby, the wheel r.p.m. is varied according to variation of friction coefficient and the characteristics of the wheel r.p.m. approximate a slip ratio $S=15\%$, as shown in FIg. 7. Therefore, the braking distance can be minimized by controlling the braking operation by the brake control system as hereinabove illustrated.

Figure 8:
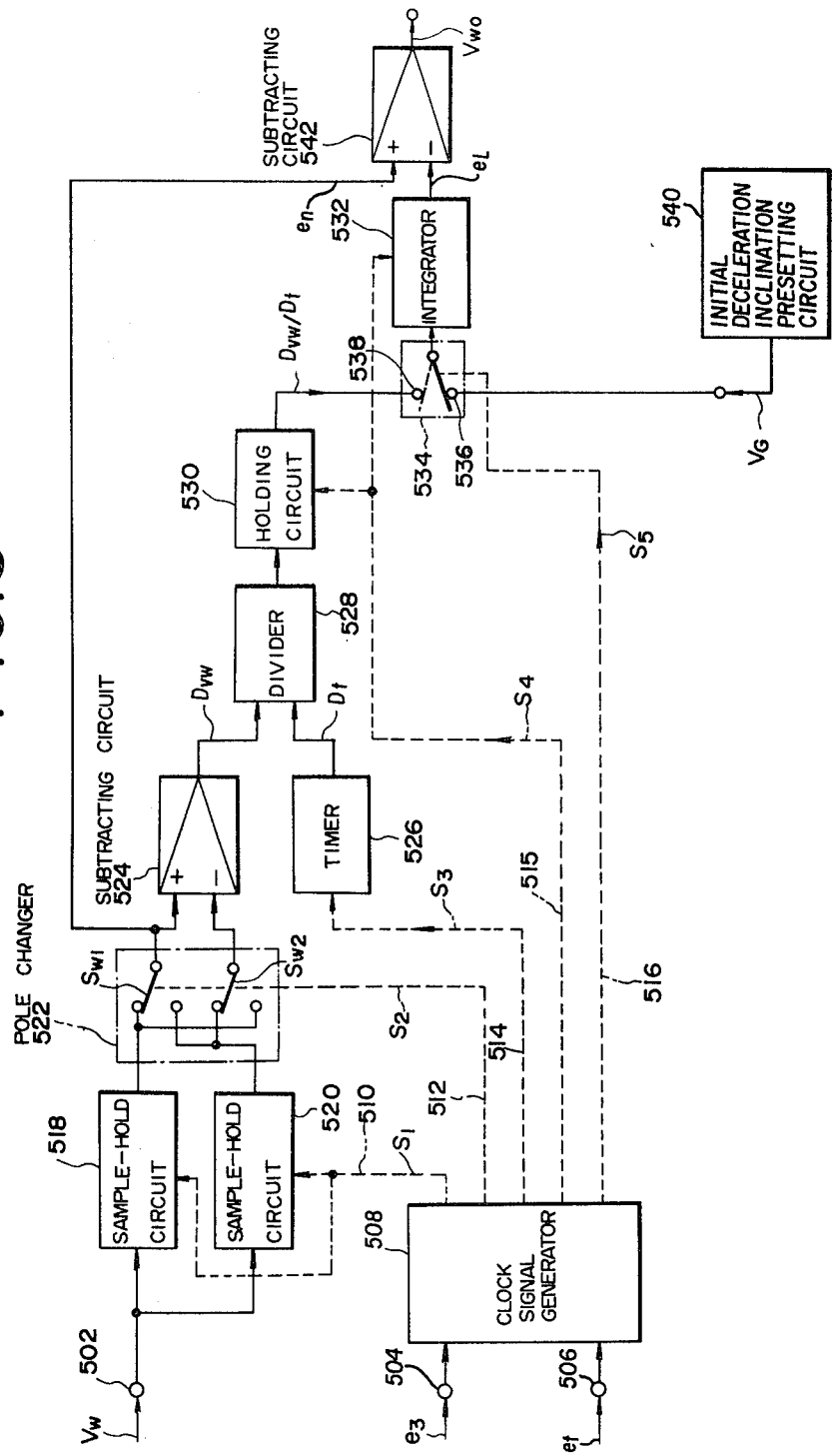
FIG. 8 is a block diagram of a preferred embodiment of a reference signal generator employed in the brake control system of FIG. 1.

Referring now to FIG. 8, there is illustrated in detail the reference signal generator 50 including the deceleration inclination determining means 52 and the target wheel r.p.m. determining means 54 of FIG. 1. The structure of the circuit shown in FIG. 8 will be described hereafter with explanation of the functions thereof with reference to time chart of FIG. 9.

Figure 3:
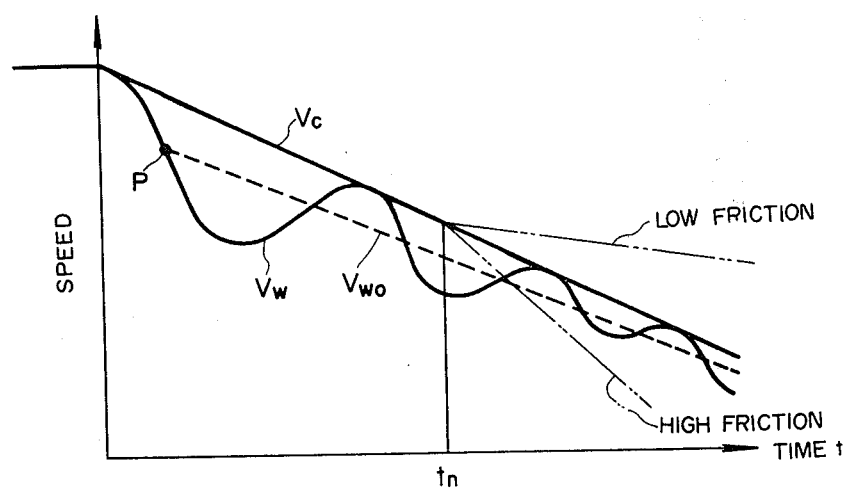
FIG. 3 is a graph showing variation of wheel r.p.m. under skid control effected by a conventional brake control system.

In FIG. 8, a sensor signal $V_w$ indicative of the wheel r.p.m. determined by the wheel r.p.m. sensor 22 of FIG. 1 is input to the deceleration inclination determining means 54 through an input terminal 502. On the other hand, the AND gate output $e_3$ generated in AND gate 32 of FIG. 3 is input to a clock signal generator 508 through an input terminal 504. A clock signal $e_t$ is also input to the clock signal generator 508 through an input terminal 506. The clock signal $e_t$ is generated by a timer (not shown) in synchronism with operation of the actuator control signal generator 34 for control of brake pressure to the wheel cylinder. Responsive to AND gate output $e_3$ and to the clock signal $e_t$, the clock signal generator 508 generates clock signals $S_1$ to $S_5$ to be fed through leads 510, 512, 514, 515 and 516 as illustrated by broken lines in FIG. 8. The clock signal $S_1$ is fed to sample-hold circuits 518 and 520 which are switched between sampling and holding modes in response thereto. Both of the sample-hold circuits 518 and 520 alternatively operate to hold the data indicative of wheel r.p.m. $V_w$ input from the wheel r.p.m. sensor 22. For example, in FIG. 8, the sample-hold circuit 520 is outputting an output $V_{w2}$ indicative of wheel r.p.m. $V_w$ being input thereto. At the same time, the sample-hold circuit 518 outputs a sampled value output $V_{w1}$ indicative of previously sampled wheel r.p.m. at time $t_1$. The outputs $V_{w2}$ and $V_{w1}$ are fed to a pole changer 522 including a pair of switches $S_{w1}$ and $S_{w2}$. The pole changer 522 changes polarities of inputs to a subtracting circuit 524. For example, in FIG. 8, in the shown positions of the switches $S_{w1}$ and $S_{w2}$, the subtracting circuit 524 calculates $V_{w1}-V_{w2}$. The switches $S_{w1}$ and $S_{w2}$ are turned to alternate positions in response to the clock signal $S_2$. In the alternate switch position, the subtracting circuit 524 calculates $V_{w2}-V_{w2}$. It will be appreciated that the subtracting circuit 524 subtracts the current wheel r.p.m. from the immediately preceding wheel r.p.m. to obtain $D_v$.

On the other hand, the clock signal $S_3$ generated by the clock signal generator 508 is fed to a timer 526. In response to the clock signal $S_3$, the timer 526 outputs a signal proportional to the time interval $D_t$ between occurrences of the AND gate outputs $e_3$. The outputs $D_{Vw}$ and $D_t$ from the subtracting circuit 524 and timer 526 are input to a divider 528. The divider 528 calculates $D_{Vw}/D_t$ to obtain the deceleration inclination of the target wheel r.p.m. $V_{w0}$. The outputs indicative of $D_{Vw}/D_t$ from the divider 528 is fed to a holding circuit 530. The holding circuit 530 holds the output of the divider 528 until receiving the clock signal $S_4$ from the clock signal generator 508. The holding circuit 530 then changes the data stored therein to indicate the output of the divider 528 responsively to the clock signal $S_4$. The output of the holding circuit 530 is fed to an integrator 532 through a switching circuit 534. The switching circuit 534 is operative in response to clock signal $S_5$ input from the clock signal generator 508. The switching circuit 534 has two input terminals 536 and 538. The terminal 536 is connected with the holding circuit 530 and the other terminal 538 is connected with the initial deceleration inclination presetting circuit 540 for presetting an initial deceleration inclination $V_{w0}$ of the first cycle of skid control. Therefore, output of either the holding circuit 530 or the initial deceleration inclination setting circuit 540 is input to the integrator 532. The integrator 532 thus generates a ramp signal $e_L$ having an inclination of $D_v/D_t$ for the target wheel r.p.m. $V_{w0}$. The output ramp is fed to a subtracting circuit 542 where the ramp signal $e_L$ is subtracted from the signal values $V_{w1}$ or $V_{w2}$ which are selectively input to the subtracting circuit 542 by switch $S_{w1}$. Thus, the subtracting circuit 542 calculates the target wheel r.p.m. $V_{w0}$ to be fed to a skid control circuit (not shown). Based on the target wheel r.p.m. $V_{w0}$ determined as above, the skid control means controls application and release of hydraulic fluid pressure to the wheel cylinders.

Figure 9:
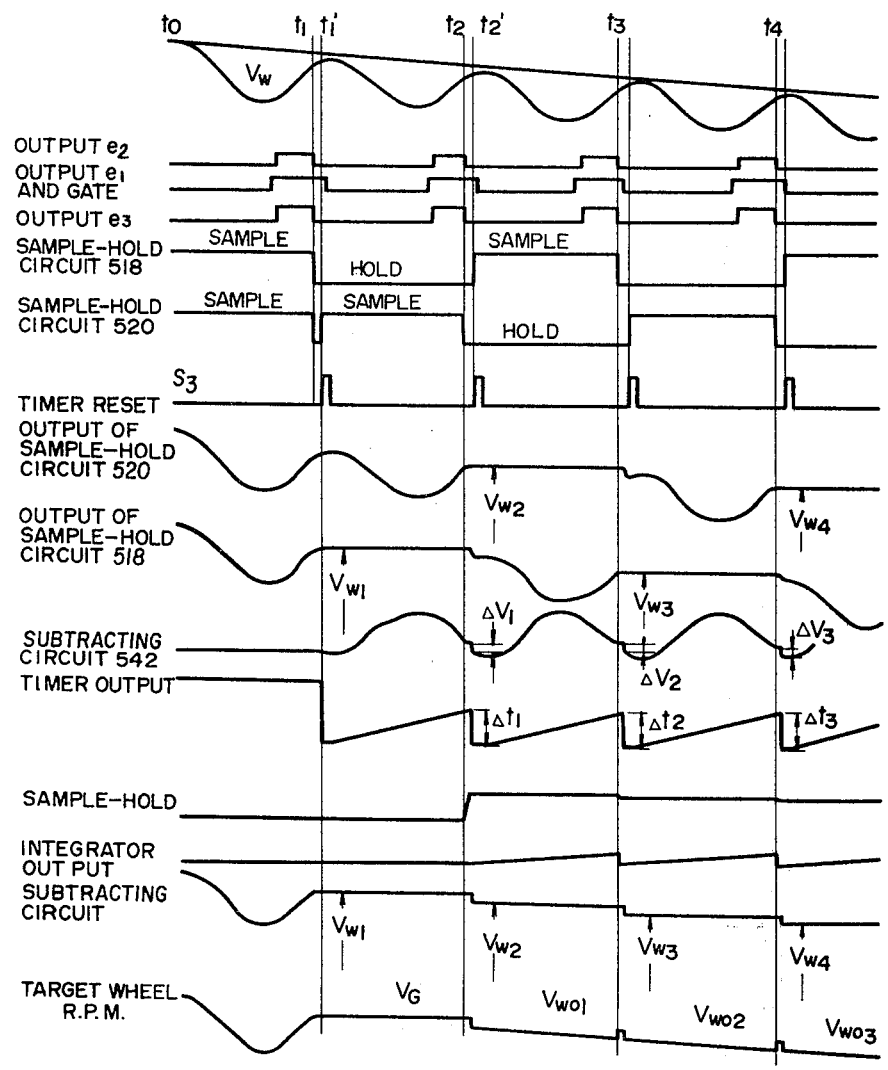
FIG. 9 is a chart of signals generated in the reference signal generator of FIG. 8.

Now, the functions of the above-described circuit will be explained with reference to the time chart shown in FIG. 9.

Generally, for anti-skid controlling for the driving wheels, variation of the wheel r.p.m. of the driven wheel is measured. By measuring variation of the driven wheel r.p.m. $V_w$, the friction coefficient F between the wheel tread and the road surface is determined. The reason for this is that since the driven wheel has a smaller inertia than that of the driving wheel, the skid cycle of the driven wheel is substantially shorter than that of the driving wheel. Therefore, for controlling the driving wheel, the friction coefficient F can be rapidly obtained. On the other hand, as is known, during one cycle of a skid controlling operation, the peak of the friction coefficients is detected twice.

Assuming the brake being applied at the time $t_0$, the brake control system becomes operative for antiskid controlling for the driven wheels. Varying of the driven wheel r.p.m. $V_w$ is determined by the wheel r.p.m. sensor 22, shown in FIG. 1. The discriminator 24 differentiates the determined wheel r.p.m. to obtain the deceleration rate of the wheel r.p.m. The discriminator 24 further operates to compare the determined deceleration rate with the predetermined value. When the deceleration rate becomes equal to or greater than the predetermined value, the discriminator outputs an output $e_s$. Responsive to the discriminator output $e_s$, the initial deceleration inclination presetting means 26 becomes operative to output signal $V_G$ indicative of the initial deceleration rate for the first cycle of skid control operation. Based on the initial deceleration inclination, the integrator 532 determines a value of ramp signal $e_L$ indicative of the deceleration of the target wheel speed during the initial cycle. The subtracting circuit 542 determines a target wheel r.p.m. $V_{w0}$ for the first cycle of skid control operation based on the input $e_n$ from either one of the sample-hold circuits 518 or 520 and the ramp signal $e_L$. The determined target wheel r.p.m. $V_{w0}$ is sequentially compared with the acutal wheel r.p.m. $V_w$ determined by the wheel r.p.m. sensor 22 in the skid control unit (not shown) for the driving wheel. When the actual wheel r.p.m. $V_w$ is decelerated to be equal to or less than the target wheel r.p.m. $V_{w0}$, the control unit outputs a control signal to the actuator for releasing brake pressure to the driving wheel cylinder. Responsive to release of brake pressure, the wheel r.p.m. recovers corresponding to the inertia of the vehicle. At this time, the rate of recovery for the wheel r.p.m. depends on the friction between the wheel tread and the road surface.

It will be remembered that the acceleration state detector 28 differentiates the sensor signal $V_w$ to obtain the acceleration rate $a_w$ of the wheel r.p.m. If the determined acceleration rate $a_w$ becomes equal to or greater than the predetermined value $a_1$, the acceleration state detector 28 generates the high level output $e_1$. Responsive to the detector output $e_1$, the actuator control signal generator 34 outputs the command to stop releasing the brake pressure and to keep it at a constant level. By further acceleration of the wheel r.p.m., the acceleration rate $a_w$ equals or exceeds the predetermined value $a_2$ preset in the acceleration ratio detector 30. Responsive to the exceeding of the predetermined value $a_2$ by the acceleration rate $a_w$, the acceleration ratio detector 30 outputs the high level output $e_2$. Both of the detector outputs $e_1$ and $e_2$ are provided to the AND gate 32 and are ANDed therein to provide the high level output $e_3$. The AND gate output $e_3$ is fed to the clock signal generator 508.

At the same time, the timer synchronized with actuator control signal generator 30 becomes operative in response to actuation of the actuator to output the clock signal $e_t$. As mentioned above, the clock signal $e_t$ is transmitted to the clock signal generator 508.

Responsive to the AND gate output $e_3$ and to the clock signal $e_t$, the clock signal generator 508 generates clock signals $S_1$ to $S_5$. The clock signal $S_1$ is fed to the sample-hold circuits 518 and 520 to switch the operational modes thereof between sampling and holding of the sensor signal $V_w$ indicative of the wheel r.p.m. $V_w$.

Assuming that, between times $t_1$ and $t_2$, sample-hold circuit 518 is in a holding mode and sample-hold circuit 520 is in a sampling mode, the output of sample-hold circuit 518 is therefore clamped to the value $V_{w1}$ of the sensor signal $V_w$ fed from the wheel r.p.m. sensor 22 immediately after detection of the peak friction coefficient $F_{max}$ at $t_1$ by the discriminator 24. Thereafter, since no input is provided to the sample-hold circuit 518, it outputs a constant value of output indicative of the sampled wheel r.p.m. $V_{w1}$. On the other hand, the input of sample-hold circuit 520 is sequentially provided the output of the wheel r.p.m. sensor 22, which output is indicative of the determined wheel r.p.m. $V_w$. The sample-hold circuit 520 correspondingly provides an output having the same value as that of the input thereto. At the first cycle of the skid control operation, the clock signal generator 508 will not generate the clock signals $S_2$ and $S_5$. Therefore, the pole changes 522 and switching circuit 534 are maintained in an as is position. Thus, the subtracting circuit 524 outputs an output indicative of $D_v = (V_{w1} - V_w)$. The clock signal $S_3$ is generated at time $t_1'$ after the sample-hold circuit 518 samples the wheel r.p.m. $V_{w1}$, to make the timer 526 operative. Thus, during the first cycle of skid control operation (from $t_1$ to $t_2$), the result of the divider 528 is not used for anti-skid control and the pre-set value $V_G$ in the initial deceleration inclination presetting means 26 is input to the integrator 532.

Next, assuming the detector outputs $e_1$ and $e_2$ are output in the next acceleration state of the wheel r.p.m., and thereby the AND gate 32 outputs the output $e_3$ at time $t_2$, the clock signal generator 508 generates the clock signal $S_4$ responsive to the AND gate output $e_3$ fed from the AND gate 32. The clock signal $S_4$ is fed to the holding circuit 530 to make it operative. Responsive to the clock signal $S_4$, the holding circuit 530 holds the inclination $(D_{v1}/D_{t1})$ obtained from the divider at the time $t_2$. Further, responsive to the clock signal $S_5$, the switching circuit 534 is switched and therefore the holding circuit 530 is connected to the integrator 532 through the terminal 538 of the switching circuit 534. At time $t_2$, the divider provides an output indicative of $(D_{v1}/D_{t1}) = (V_{w1} - V_{w2})/(t_1 - t_2)$. Therefore, corresponding to the divider output $(D_{v1}/D_{t1})$, the deceleration inclination for the target wheel r.p.m. during the interval $t_2$ to $t_3$ is set in the integrator 532. The integrator 532 generates the ramp signal $e_L$ having a constant slope $(D_{v1}/D_{t1})$.

On the other hand, immediately after the time $t_2$, the clock signal generator 508 generates clock signals $S_1$, $S_2$ and $S_3$ at time $t_2'$. The clock signal $S_1$ is fed to the sample-hold circuits 518 and 520 to change the operational modes thereof between sampling mode and holding mode. Responsive to the clock signal $S_1$, the sample-hold circuit 520 samples the wheel r.p.m. $V_{w2}$ during the time $t_2$ to $t_2'$ and transitions to the hold mode, thus outputting during the interval $t_2'$ to $t_3$ a constant value of signal indicative of sampled wheel r.p.m. $V_{w2}$. On the other hand, during this interval the sample-hold circuit 518 is now provided with an input representing the varying sequence of values of the wheel r.p.m. $V_w$ determined by the wheel r.p.m. sensor 22, and provides this value as its output. Since switch $S_{w1}$ was switched by signal $S_2$ at $t_2'$ to connect to sample-hold circuit 520, the constant value $V_{w2}$ of the output of the sample-hold circuit 520 is input to the subtracting circuit 542 during the interval $t_2'$ to $t_3$. During this interval, the subtracting circuit 542 subtracts the value of the ramp signal $e_L$ from the input value $V_{w2}$ to obtain the target wheel r.p.m. $V_{w0}$.

As above described, the clock signal $S_2$ is fed to the pole changes 522 at $t_2'$ to switch the positions of the switches $S_{w1}$ and $S_{w2}$. By switched operation of the pole changer 522, the sample-hold circuit 518 is switched from the positive terminal of the subtracting circuit 524 to be connected to its negative terminal and the sample-hold circuit 520 is switched to the positive terminal thereof. Therefore, the subtracting operation executed by the subtracting circuit 524 is alternated and during the interval $t_2'$ to $t_3$ $D_v = (V_{w2} - V_w)$ is obtained. Further, the clock signal $S_3$ resets the timer 526 during the rise time thereof and makes the timer operative again for newly measuring the interval from the time $t_2'$ to the next time of detecting the peak $F_{max}$ of the friction coefficient. Thus, using the timer 526, the interval $D_t$ between the occurrences of the peak of the friction coefficient is determined.

By repeating the above-mentioned operation for determining the target wheel r.p.m. $V_{w0}$, the driving wheels are accurately and satisfactorily anti-skid controlled according to the variation of friction coefficient between the wheel tread and the road surface.

Figure 10:
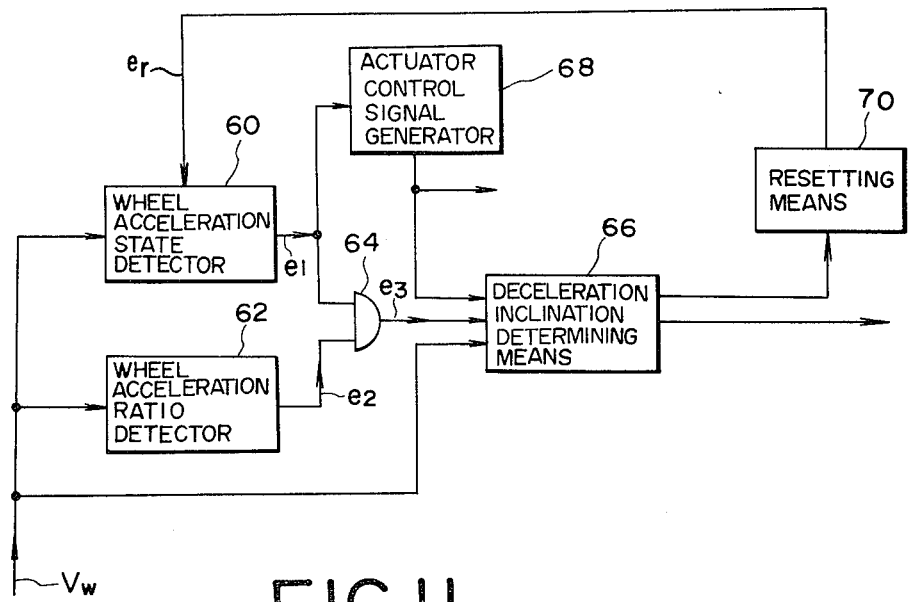
FIG. 10 is a schematic block diagram of another embodiment of the brake control system according to the present invention, in which are illustrated the modified portions only and from which are omitted the elements common with the preceding embodiment.

Now, referring to FIG. 10, there is illustrated a modification of the foregoing embodiment of the brake control system according to the present invention. In the present modification, a resetting means is provided to reset operation of the actuator control signal generator. In FIG. 10, the reference numerals 60 and 62 respectively represent the wheel acceleration state detector corresponding to the same element 28 in FIG. 1 and the wheel acceleration ratio detector corresponding to the same element 30 in FIG. 1. Both the wheel acceleration state detector 60 and wheel acceleration ratio detector 62 function generally the same as the corresponding elements of the foregoing embodiment. Namely, these detectors 60 and 62 respectively determine the acceleration ratio $a_w$ and compare the determined acceleration ratio with predetermined values $a_1$ and $a_2$. Each of the wheel acceleration state detector 60 and the wheel acceleration ratio detector 62 generates a detector output $e_1$ and $e_2$ when the acceleration rate $a_w$ equals or exceeds the respective predetermined value $a_1$ and $a_2$. The AND gate 64 ANDs the detector outputs $e_1$ and $e_2$ to obtain output value $e_3$. Responsive to the AND gate output $e_3$, the deceleration inclination determining means 66 becomes operative. The operation of the deceleration inclination determining means 66 is substantially the same as the means in FIGS. 1 and 8.

On the other hand, the actuator control signal generator 68 becomes operative responsive to the detector output $e_1$ to stop release of brake pressure and keep it at a constant level. A resetting means 70 is connected with the deceleration inclination determining means 66 to generate a reset commnd $e_r$ responsive to the determined deceleration inclination output. The reset command $e_r$ is fed to the wheel acceleration state detector 60. The reset command $e_r$ acts as a switching signal to drop the output level of the detector output $e_1$ to a low level to inactivate the actuator control signal generator 68, to end the signal of the actuator control signal generator for maintaining the brake pressure constant and to generate a control signal to recover the brake pressure.

Several approaches may be used for detecting the output of the determined deceleration inclination in the deceleration inclination determining means 66. Of course it is possible to detect the outputting of the deceleration inclination in any suitable way. However, in the preferred embodiment, the state of outputting the deceleration inclination is detected by the clock signal $S_4$. When the clock signal $S_4$ is detected, the signal value is differentiated and thereby modulates the reset command.

Figure 11:
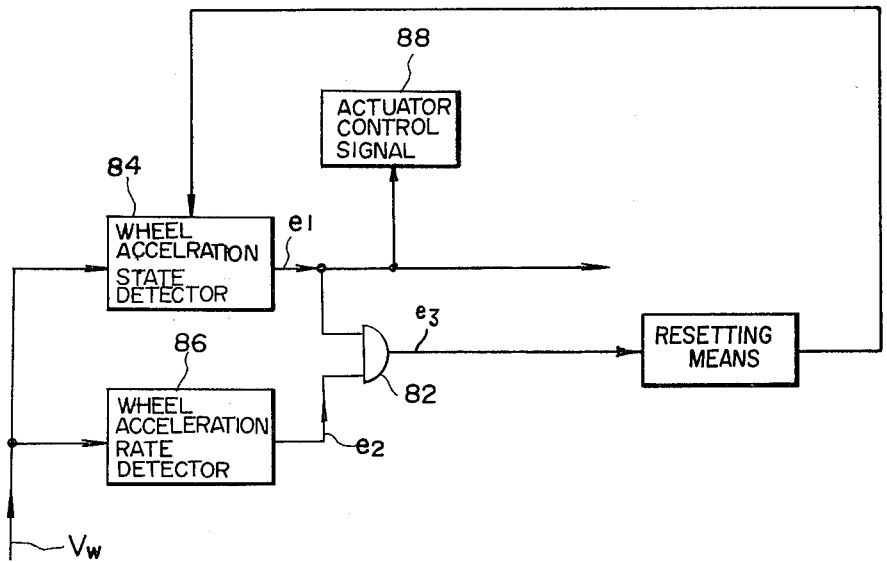
FIG. 11 is a schematic diagram of a modification of the brake control system of FIG. 10, in which the AND gate functions as resetting means for resetting the actuator control signal generator.

FIG. 11 shows a variation of the brake control system of FIG. 10. In this embodiment, the resetting means 80 is connected with the AND gate 82. Similarly to the preceding embodiment, the AND gate 82 generates the output $e_3$ based on the detector signal $e_1$ and $e_2$ respectively fed from the wheel acceleration state detector 84 and the wheel acceleration ratio detector 86. Responsive to the AND gate output $e_3$, the resetting means 80 generates a reset command $e_r$. The reset command $e_r$ is fed to the wheel acceleration state detector 84 to reset the same. Responsive to the output level of the wheel acceleration state detector 84, the actuator control signal generator 88 stops the operation of releasing brake pressure.

Figure 12:
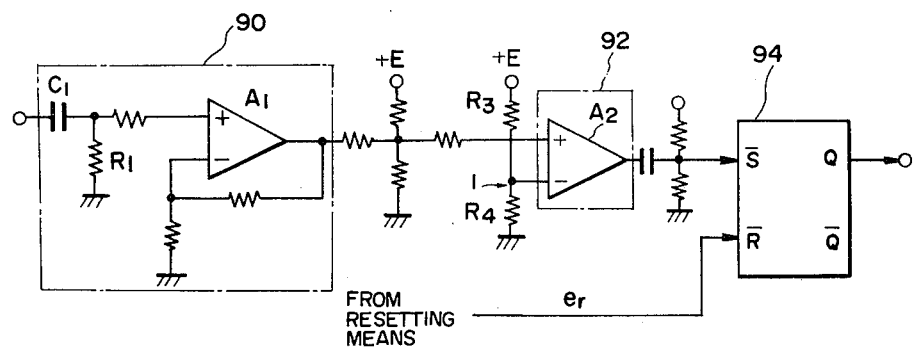
FIG. 12 is a circuit diagram of the wheel acceleration state detector as a modification of the circuit of FIG. 4 and being modified for application to the brake control systems of FIGS. 10 and 11.

FIG. 12 shows a modification of circuit construction of the wheel acceleration state detector 28 in order to be applicable to the systems of FIGS. 10 and 11. As stated with reference to FIG. 4, the wheel acceleration state detector 84 generally comprises the differentiation circuit 90 comprised of a capacitor $C_1$, a resistor $R_1$ and an amplifier $A_1$, and the comparator 92 comprised of an amplifier $A_2$. In the shown modification a flip-flop 94 is connected to the amplifier $A_2$ of the comparator 92. The flip-flop is set responsive to high level output of the comparator 92 and is reset responsive to the reset command $e_r$ fed from the resetting means 70 or 80 of FIGS. 10 and 11. Thus, responsive to the reset command $e_r$, the output level of the wheel acceleration state detector attains a low level to inactivate the actuator control signal generator.

Figure 13:
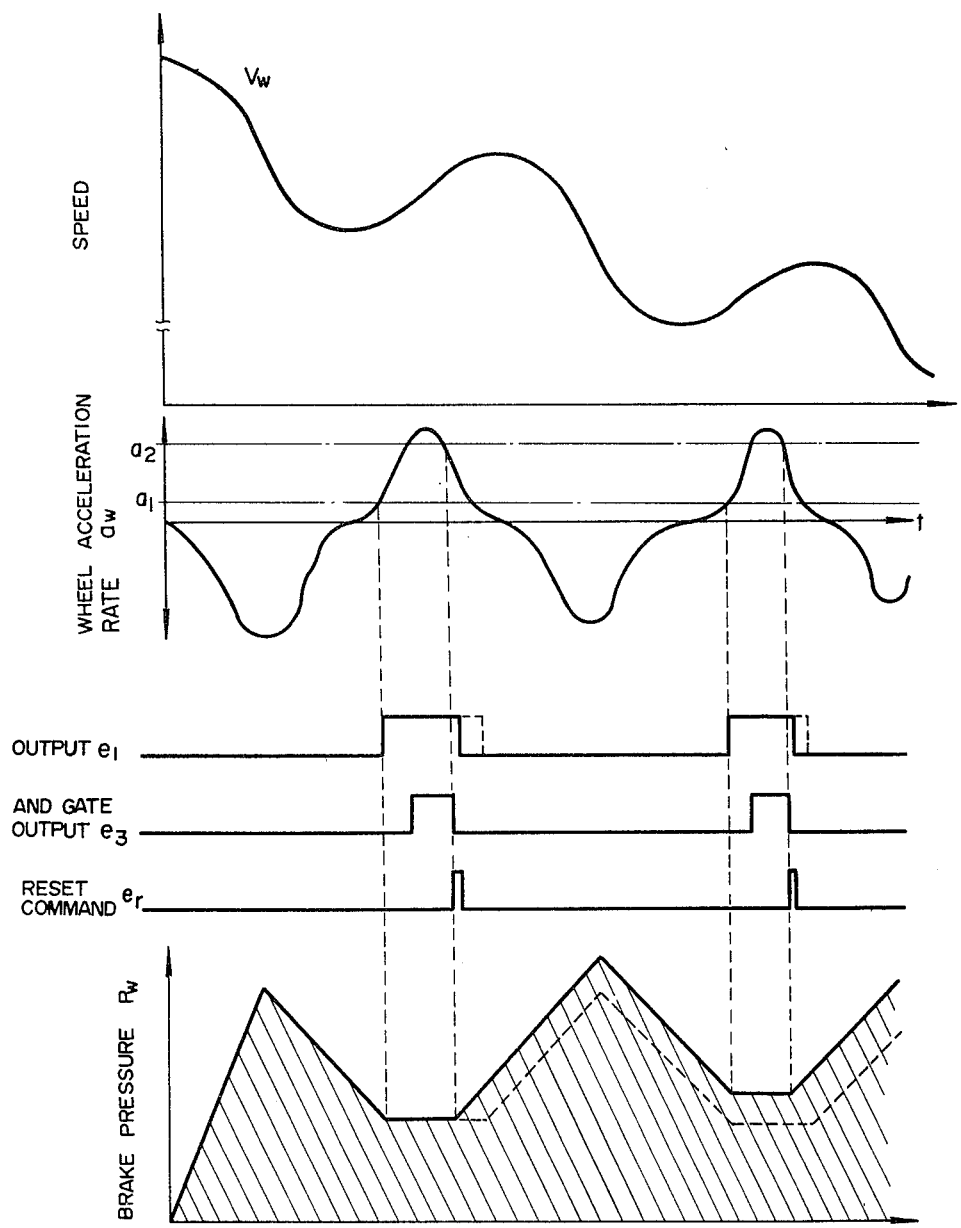
FIG. 13 is a graph showing a relationship of variations of wheel r.p.m. and acceleration ratio, the outputs of the acceleration state detector, the AND gate, and the resetting means, and variation of brake pressure.

FIG. 13 illustrates the variation of brake pressure controlled by the brake control system of FIGS. 10 and 11, in relation to the wheel r.p.m. $V_w$, the wheel acceleration rate $a_w$, the detector output $e_1$, the AND gate output $e_3$ and the reset command $e_r$. Upon exceeding the predetermined value $a_1$ of the acceleration rate $a_w$, the detector output $e_1$ is ouput from the wheel acceleration state detector. Responsive to the detector output $e_1$, the actuator control signal generator generates the control signal and provides it to the actuator. Thus, the actuator operates to keep the brake pressure at a constant level. Responsive to dropping of the AND gate output $e_3$, the resetting means becomes operative to output the reset command $e_r$ which is fed to the wheel acceleration state detector. In response to command $e_r$, the wheel acceleration state detector becomes reset and thereby the output $e_1$ thereof drops to a low level. By dropping the output level of the detector output $e_1$, the actuator control signal generator becomes inoperative to stop outputting of the control signal. Thus, the brake pressure recovers to effect the wheel cylinder to apply the brake.

In these embodiments, since the brake pressure is recovered in response to determination of a deceleration inclination or to dropping of wheel acceleration to a value less than the predetermined value $a_2$ of the wheel acceleration ratio detector, the brake pressure recovers more quickly than provided by the timing of the preceding embodiment. Therefore, even if the coefficient of friction between the wheel tread and the road surface is rather high, the system can effectively and satisfactorily prevent the vehicle from travelling because of application of a reduced brake pressure.

Figure 14:
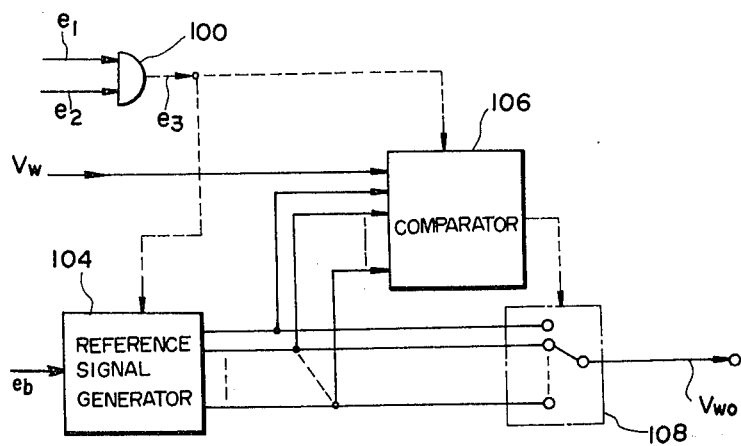
FIG. 14 is a still further embodiment of the brake control system according to the present invention, in which the target wheel r.p.m. is selected among different preset values.
Figure 15:
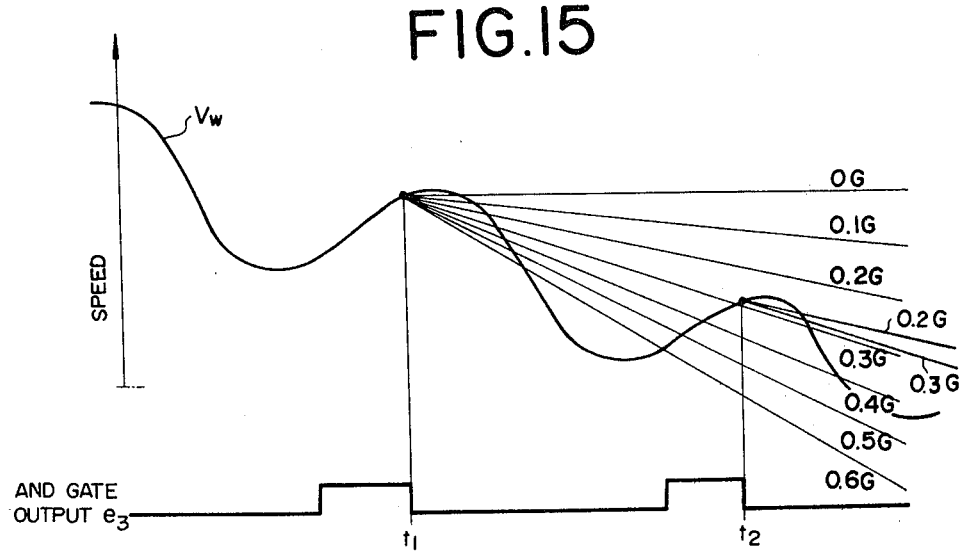
FIG. 15 is a graph showing deceleration ratio preseted in the brake control system of FIG. 14.

Referring now to FIGS. 14 and 15, there is illustrated still another embodiment of the brake control system according to the present invention. In the shown embodiment, several different values of deceleration inclinations are preset. One of the preset deceleration inclinations is selected corresponding to wheel r.p.m. The target wheel r.p.m. determining means determines the target wheel r.p.m. based on the selected deceleration inclination. Since the brake control system of the shown embodiment includes a number of common elements therein which are previously described, some of these elements have been omitted from FIG. 14. Therefore, description of the present embodiment begins with an AND gate 100 which functions substantially the same as in previous embodiments. Namely, responsive to the output $e_1$ of the wheel acceleration state detector and the output $e_2$ of the wheel acceleration ratio detector, the AND gate outputs an output $e_3$. The AND gate output $e_3$ is fed to a reference signal generator 104. Responsive to the AND gate output $e_3$, the reference signal generator 104 generates various values of signals, 0G to 0.8G. These signals 0G to 0.8G, as shown in FIG. 15, respectively indicate preset values of deceleration inclination of the wheel r.p.m. The signals 0G to 0.8G are fed to a comparator 106. At the same time, a signal fed from the wheel r.p.m. determining means and indicative of the determined wheel r.p.m. $V_w$ is input to the comparator 106. In the comparator, the signal $V_w$ is compared with the signals 0G to 0.8G. The comparator selects one of the signals 0G to 0.8G the value of which is closest to the value of $V_w$. Thus, the signal indicative of desired target wheel r.p.m. $V_{w0}$ can be output to the skid control means of the driving wheel.

By this embodiment, constructed as above, the structure of the system can be further simplified.

Here, assuming the brake is applied and the deceleration rate $dV_w/d_t$ of the wheel r.p.m. equals or exceeds the predetermined value $V_{set}$ at a time $t_1$, the deceleration state detector generates a signal $e_b$. Responsive to the signal $e_b$, the reference signal generator 104 generates various values of signals 0G to 0.8G. At this time, the comparator 106 is maintained in an inoperative condition.

Since comparator 106 is inoperative, the target wheel r.p.m. $V_{w0}$ for the first cycle of the skid control operation will not be provided to the skid control system. However, as stated above, cycles of skid control for the driving wheel and the driven wheel are substantially different and the skid control for the driving wheel will lag behind that of the driven wheel, so that no problem is caused by the inoperative condition of the comparator. But, if necessary, the initial deceleration inclination setting means, which is constructed similarly to the foregoing embodiments, is provided in the system.

Responsive to the second AND gate output $e_3$ generated at time $t_2$, the comparator 106 becomes operative. The comparator 106 compares the signal indicative of wheel r.p.m. $V_{w2}$ at the time $t_2$ with the values of signals 0G to 0.8G previously generated in response to the first signal $e_b$ as reduced at prdetermined rates corresponding to passing of time. As shown in FIG. 15, if the value of signal $V_w$ is intermediate between values of the signals 0.2G and 0.3G, the comparator 106 provides an output indicative of deceleration inclination corresponding to a signal value of either 0.2G or 0.3G. Thus, based on the determined deceleration inclination, the target wheel r.p.m. determining means 108 determines the target wheel r.p.m. $V_{w0}$.

Similarly to responding to the first signal $e_b$, the reference signal generator 104 generates signals 0G to 0.8G in response to the second signal $e_b$. These signals 0G to 0.8G are used with the next cycles of skid control operation.

From the third skid control operation, each circuit of the target wheel r.p.m. determining means repeats the same function as the above-explained second skid control operation.

As described above, the brake control system according to the present invention varies the target wheel r.p.m. corresponding to variation of the coefficient of friction between the wheel tread and the road surface during skid control operation. Variation of the friction coefficient is determined by detection of the acceleration rate of wheel r.p.m. Thus, even when friction varies significantly during the braking condition, the wheel r.p.m. is decelerated at the most effective rate in order to decelerate the vehicle satisfactorily and effectively.

Preferably, the system detects variation of the acceleration rate of the driven wheels for skid control of the driving wheel, since the skid cycle of the driven wheel is considerably earlier than that of the driving wheel. This approach is useful in increasing the accuracy of detection of the peak of the friction coefficient.

What is claimed is:

1. An anti-skid control system for an automotive vehicle comprising:

first means for detecting a wheel r.p.m. to produce a first signal having a value indicative of the wheel r.p.m.;

second means for calculating an acceleration rate of wheel r.p.m. operative during acceleration of the wheel r.p.m. due to release of brake pressure in an automotive hydraulic brake system for calculating said acceleration rate based on variation of said first signal value and for comparing said acceleration rate with a given threshold to produce a second signal when said acceleration rate equals or exceeds said given threshold;

third means, responsive to said second signal, for calculating a deceleration inclination in a next skid cycle based on a variation of said first signal value within an interval between occurrences of said second signal and on the length of said interval, and for calculating a deceleration r.p.m. based on said first signal value at an occurrence of said second signal and on said decelerating r.p.m., said third means producing a third signal representative of said target wheel r.p.m.; and fourth means for comparing sequentially varying first signal values with said third signal value to release said brake pressure when said first signal value becomes equal to or less than said third signal value.

2. An anti-skid control system for an automotive vehicle comprising:

first means for detecting a wheel r.p.m. to produce a first signal having a value indicative of the wheel r.p.m.;

second means for calculating an acceleration rate of wheel r.p.m. operative during a period of release of brake pressure in an automotive hydraulic brake system, for calculating said acceleration rate based on variation of said first signal value, and for comparing said acceleration rate with a given threshold to produce a second signal when the acceleration rate becomes equal to or greater than said given threshold;

third means, responsive to said second signal, for calculating a deceleration inclination based on variation of said first signal value within an interval between occurrences of said second signals and on the length of said interval, and for calculating a target wheel r.p.m. drop based on said deceleration inclination and on time from the occurrence of said second signal, and for calculating a target wheel r.p.m. based on said target wheel r.p.m. drop and said first signal value at the occurrence of said second signal, said third means producing a third signal having a value representative of said target wheel r.p.m.; and fourth means for comparing said first signal value sequentially input from said first means with said third signal value to release said brake pressure when said first signal value becomes equal to or less than said third signal value, said fourth means resuming application of the brake pressure when said first signal value becomes equal to or greater than said vehicle speed signal value.

3. An anti-skid control system as set forth in claim 1, wherein said second means comprises:

a first detector means for determining an acceleration rate based on the detected wheel r.p.m. and for comparing the determined acceleration rate with a first predetermined value, said first detector means generating a first detector signal responsive to said acceleration rate being equal to or larger than said first predetermined value, a second detector means for determining an acceleration rate based on the detected wheel r.p.m. and for comparing the determined acceleration rate with a second predetermined value, said second detector means generating a second detector signal responsive to said acceleration rate being equal to or larger than said second value, and an AND means receiving the first and second detector signals and generating a command signal for making said third means operative.

4. An anti-skid control system as set forth in claim 1, wherein said second predetermined value is larger than said first predetermiend value.

5. An anti-skid control system as set forth in claim 1 or 2, wherein the system further comprises a stopping means responsive to said second signal for stopping the release of said brake pressure and for maintaining the brake pressure at a constant level.

6. An anti-skid control system as set forth in claim 5, wherein said stopping means for stopping release of brake pressure is incorporated with a resetting means for resetting the operation of said stopping means, said resetting means being responsive to a clamping command of said first signal value to make said third means operative to clamp said first signal value.

7. An anti-skid control system as set forth in claim 1 or 2, wherein said third means comprises a first circuit for receiving said first signal and for holding a value of said input first signal in response to a clock signal;

a second circuit means for receiving said second signal from said second means and for generating said clock signal responsive to said second signal to make said first circuit means operative to hold said signal value;

a third circuit means for measuring an interval between said second signals;

a fourth circuit means for determining a difference between current and immediately preceding values of said first signals held in said first circuit means and for obtaining said deceleration inclination of wheel r.p.m. based on the determined difference and on the interval measure by said third circuit means a fifth circuit means for determining a value of said ramp signal based on the determined deceleration inclination of wheel r.p.m.; and a sixth circuit means for determining the target wheel r.p.m. by subtracting the value of said ramp signal from the value of a current first signal held in said first circuit means.

8. An anti-skid control system as set forth in claim 7, wherein said third means further comprises:

a seventh circuit means for presetting an initial deceleration inclination of wheel r.p.m. for the first cycle of skid control operation and generating a signal representative of said preset deceleration inclination; and an eighth circuit means for selectively inputting signals generated in said fourth circuit means and in said seventh circuit means to said fifth circuit means, said eighth circuit means being operative to input signal generated by said seventh circuit means in response to the first second signal and to switch the input signal from the eighth circuit means to said fourth circuit means responsive to the second second signal.

9. An anti-skid control system as set forth in claim 7, wherein said fourth circuit means comprises a pair of sample-hold circuit means operating alternately for sampling and holding said first signal, one of which provides an output corresponding to the held first signal of an immediately preceding cycle of skid control operation and the other provides an output corresponding to input current first signal, a switching circuit means for selectively inputting said first signal to one of said sample-hold circuit and a divider receiving outputs from said sample-hold circuit means, for subtracting said output value corresponding to the held first signal from the output value corresponding to the input first signal value and for dividing the difference between said outputs obtained by subtraction by the length of said interval fed from said third circuit means.

10. An anti-skid control system as set forth in claim 9, wherein said switching circuit means is operative to switch operation of said sample-hold circuits in response to said clock signal fed from said second circuit means.

11. A method for controlling application and release of brake pressure to a brake device of each vehicle wheel of an automotive vehicle in order to prevent the vehicle from skidding and thereby minimizing braking distance, comprising the steps of:

determining a wheel r.p.m. and generating a first signal indicative of the determined wheel r.p.m.;

detecting an acceleration rate of wheel r.p.m. during release of said brake pressure to produce a second signal when said acceleration rate becomes equal to or greater than a given threshold;

determining a target wheel r.p.m. responsive to said second signal based on a difference between said first signal value within an interval of occurrence of said second signals and said first signal value at the occurrence of said second signal;

comparing said target wheel r.p.m. with actual wheel r.p.m. represented by said signal; and controlling application and release of brake pressure applied to the braking device of each vehicle wheel corresponding to the result of said step of comparing the target wheel r.p.m. and actual wheel r.p.m.

12. A method as set forth in claim 11, wherein determining of ramp signal value of the presetted value is carried out responsive to first clock signal generated in response to detecting of first peak of friction coefficient and is ceased in response to second clock signal generated responsive to second peak of friction coefficient.

13. The system as set forth in claim 1 or 2, wherein said third means comprises a first circuit means for detecting variation of said first signal value within said interval of said second signal, a second circuit means for measuring the length of said interval, a third circuit means for calculating said deceleration inclination based on said variation of said first signal and said length of said interval, and a fourth circuit means for calculating said target wheel r.p.m. based on said first signal value at the occurrence of said second signal and on said deceleration inclination.

14. The system as set forth in claim 4, wherein said second means comprises a first circuit means for differentiating said first signal value to determine said acceleration rate, a second circuit means for producing a reference signal representative of said given threshold and a third circuit means for comparing said acceleration rate with said reference signal value to produce said second signal when said acceleration rate is equal to or greater than said reference signal value.

15. The system as set forth in claim 1 or 2, wherein said second means comprises a first detector means for calculating said acceleration rate based on variation of said first signal and for comparing the acceleration rate with a first threshold to produce a first detector signal when said acceleration rate becomes equal to or greater than said first threshold, and a second detector means for calculating said acceleration rate and for comparing said acceleration rate with a second threshold to produce a second detector signal when said acceleration rate becomes equal to or greater than said second threshold, said second means operative for producing said second signal when an AND condition of said first and second detector signal is established.

16. The system as set forth in claim 15, wherein said first threshold value is smaller than said second threshold value.

17. The method as set forth in claim 11, wherein said step of detecting an acceleration rate comprises the further steps of differentiating said wheel r.p.m. to obtain said acceleration rate and comparing said acceleration rate with said given threshold.

18. The method as set forth in claim 17, wherein said step of comparing said acceleration rate comprises the steps of comparing said acceleration rate with first and second thresholds having different preset values and wherein said second signal is produced when said acceleration rate exceeds both of said first and second thresholds.

19. The method as set forth in any one of claims 11, 12, 17 or 18 wherein the step of determining said target wheel r.p.m. comprises the steps of calculating an amount of variation of said wheel r.p.m. within an interval of the occurrence of said second signal, measuring the length of said interval, dividing said variation amount by said length of the interval to obtain a deceleration inclination, calculating a target wheel r.p.m. drop based on said deceleration inclination, and subtracting said target wheel r.p.m. drop from said wheel r.p.m. determined at occurrence of said second signal.

20. The method as set forth in claim 19, wherein said step of measuring of the length of interval includes the step of using a clock signal produced in response to said second signal.

21. The method as set forth in claim 20, further including the steps of determining an initial target wheel r.p.m. with a preset deceleration inclination, and reading out said preset deceleration inclination in response to the first occurrence of said second signal.

22. The method as set forth in claim 21, comprising the further steps of terminating the step of determining an initial target wheel r.p.m. in response to the second occurrence of said acceleration signal and replacing the step of determining an initial target wheel r.p.m. by a step for determining the target wheel r.p.m. based on said amount of variation of the wheel r.p.m. and on the interval of occurrence of said acceleration signals.

* * * * *